July 30, 1957 B. R. ADAMS 2,800,741
BAIT BOX
Filed Sept. 15, 1954

INVENTOR.
B. R. Adams
BY
ATTORNEY

United States Patent Office 2,800,741
Patented July 30, 1957

2,800,741
BAIT BOX

Blythe R. Adams, Higginsville, Mo.

Application September 15, 1954, Serial No. 456,139

3 Claims. (Cl. 43—55)

This invention relates to improvements in containers for live fishing baits.

As most fishermen well know, the keeping of live bait during a fishing trip is an annoying and distasteful job, particularly when more than one type of bait is used. At the present time, the majority of live bait is kept either in an open topped container or a container requiring the use of both hands to open. And if more than one type of bait is being used, a fisherman has several cans or containers to stumble over in the fishing process.

The present invention contemplates a novel bait box or container which may be partitioned to keep various types of bait in the one box. The box is constructed to admit air to the bait, and the box may be easily opened with one hand to gain access to the bait. Furthermore, the box may be used as a seat for the fisherman if desired. The present invention also contemplates the provision of storage on the box for artificial lures and miscellaneous small equipment.

An important object of this invention is to facilitate the keeping of live fishing bait.

Another object of this invention is to provide a convenient storage for a plurality of types of live fishing baits in one container.

Another object of this invention is to provide an easily accessible bait box which will effectively keep the bait until needed.

A further object of this invention is to keep live fishing bait alive for a maximum length of time.

Other objects and advantages of the invention will be evident from the following detailed description, when read in conjunction with the accompanying drawings, which illustrate one embodiment of my invention.

Figure 1:
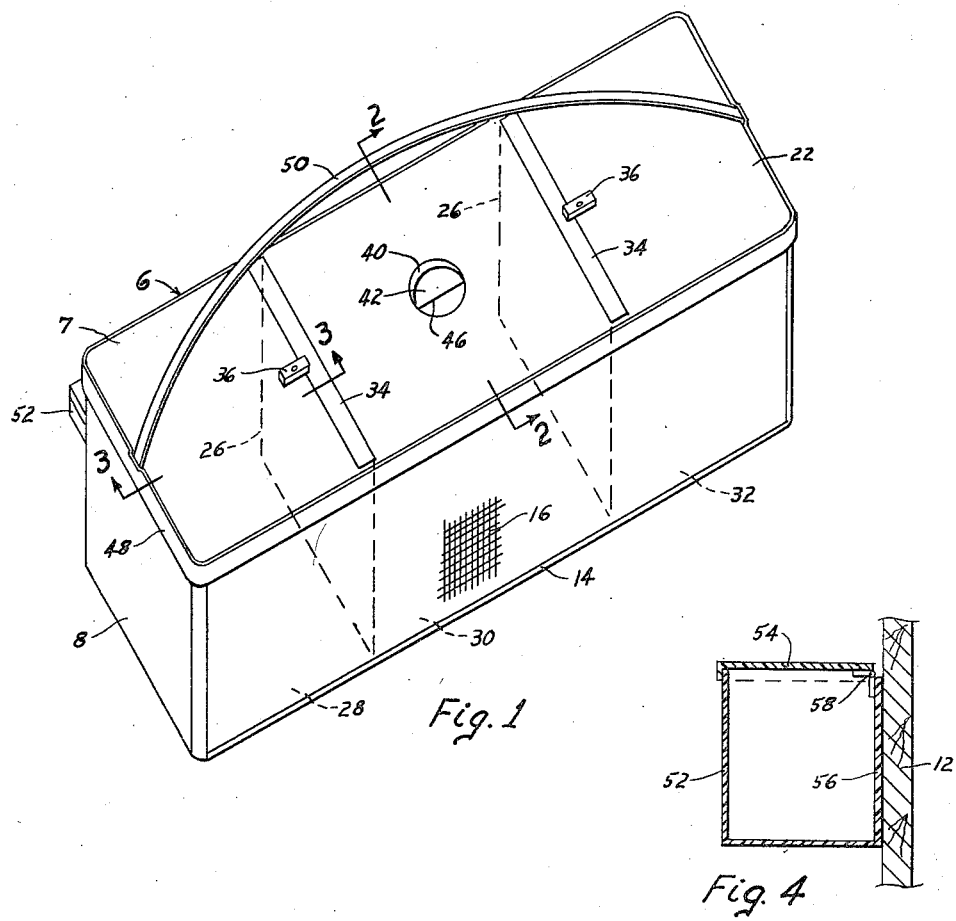
Figure 1 is a perspective view of my novel bait box.
Figures 2, 3:
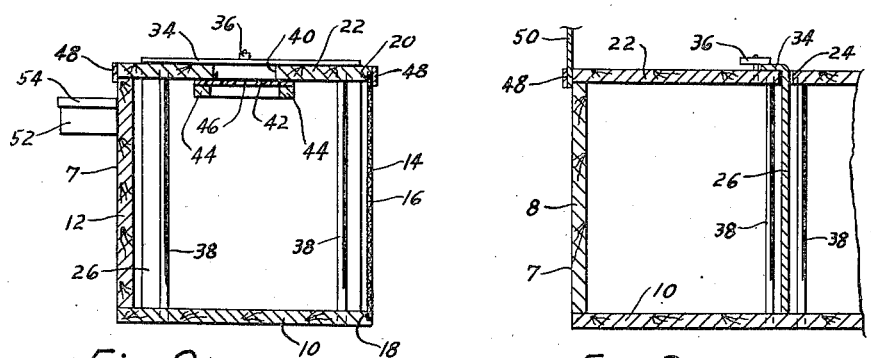
Figure 2 is a cross sectional view of the box taken along lines 2—2 of Figure 1.
Figure 3 is another cross sectional view of the box taken along lines 3—3 of Figure 1.

Referring to the drawings in detail, and particularly Figure 1, reference character 6 generally designates my novel bait box, which comprises a substantially rectangular housing 7. The housing 7 is preferably constructed out of wood, with solid end walls 8, and a solid bottom wall 10 (Figure 2). One side wall 12 of the housing 7 is also solid. However, the opposite side 14 is enclosed by a suitable screening material 16, such as hardware cloth or the like. A groove 18 is formed in the upper edge of the bottom 10 at the side 14 to receive the lower end of the screen 16. Also, a groove 20 is formed in the bottom edge of the top wall 22 above the groove 18 to receive the upper end of the screen 16. Similar grooves (not shown) are formed in the appropriate edges of the end walls 8 to receive the opposite side ends of the screen 16 and position the screen 16 substantially flush with the exposed edges of the ends 8, bottom 10 and top 22.

The screen 16 is secured in the above-described grooves in any suitable manner, such as by the use of nails (not shown). The ends 8, bottom 10, side 12 and top 22 are similarly interconnected to provide a rigid structure. Furthermore, the vertical edges of the housing 7 are rounded as shown in Figure 1 to enhance the appearance of the box, as well as to eliminate the sharp edges which could cut anyone handling the box.

The top 22 (Figure 3) is provided with a pair of transverse, spaced slots 24 to slidingly receive a pair of partitions 26. Each partition 26 extends into close proximity with the sides 12 and 14 of the housing 7 to effectively partition the housing into three compartments 28, 30 and 32. The lower end of each partition 26 contacts the bottom 10, and the upper end 34 is bent substantially ninety degrees toward the adjacent end 8 of the housing 7. A suitable latch 36 is pivotally secured to the top 22 adjacent each slot 24 to overlap the respective partition top 34 and retain the partitions 26 in the box 6, regardless of the direction the box is tilted. The partitions 26 are additionally supported, as well as being guided, by spaced rods 38 secured in the housing 7. The rods 38 are embedded in the top 22 and bottom 10, and are arranged in pairs at each end of each slot 24 to prevent bending or tilting of the partitions 26.

An aperture 40 is formed in the central portion of the top 22 to provide a bait inlet to the housing 7. The inlet 40 is closed by an elastic sheet or cover 42, such as rubber, secured to the under face of the top 22 by retaining strips 44. The elastic cover 42 is split at 46 along one diameter of the inlet 40, whereby the cover 42 may be parted to gain access to the interior of the housing 7.

A trimming band 48, such as aluminum or steel, is secured around the edges of the top 22 and overlaps the adjacent edges of the ends 8, side 12 and screen 16. The band 48 strengthens the housing 7 and provides an attractive appearance. Also, the band 48 is used to secure the opposite ends of a carrying strap 50 to the end pieces 8.

Figure 4:
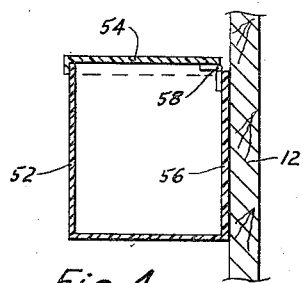
Figure 4 is an enlarged detailed cross sectional view of one of the artificial lure storage compartments.

Suitable small boxes 52 may be secured along the side 12 to store artificial lures (not shown) and the like, if desired. Each box 52 (see Figure 4) is preferably formed out of plastic and has a top 54 secured to the back 56 of the box by a hinge 58. The back 56 of each box 52 is in turn secured to the side 12 by screws or the like (not shown) in a position to place the tops 54 parallel to and slightly under the band 48.

Operation

Substantially any type of live bait, such as grasshoppers, crawdads and frogs, may be stored in the bait box 6. The elastic sheet or cover 42 is merely forced apart at the split 46 and the bait is placed into the compartment 30. If it is desired to use more than one type of bait, one of the partitions 26 is removed and the box 6 is tilted to drop the first bait into the respective compartment 28 or 32. The removed partition 26 is then replaced and the respective latch 36 is rotated to overlap the end 34. The second type of bait is then inserted through the inlet 40 and cover 42 into the compartment 30. It will be apparent that the second partition 26 may then be removed if it is desired to move the second bait into the opposite end of the housing 7. Furthermore, the baits may be moved around in the housing 7 by manipulating the partitions 26 to provide periodic changes in the type of bait as desired by the fisherman.

The present bait box may also be used to store minnows if desired. The box may be readily immersed in water and removed when the minnows are needed, substantially in the same manner as the usual minnow bucket (not shown).

The screen 16 provides for a circulation of air through the housing 7 when the box is used for bait requiring oxygen, and provides for a circulation of water through the housing when the box is used to keep minnows. Furthermore, the box 6 provides a convenient seat for the fisherman. When the box is turned on end (not shown), the fisherman can sit on the upper end and reach in through the inlet 40 for bait without changing position. It will be noted that the elastic cover 42 will spring back into a closed position automatically each time the fisherman's hand is removed. Also, only one hand is needed to open the box 6 and remove bait therefrom. Similarly, each of the lure boxes 52 may be readily opened for removal of artificial lures or equipment stored therein.

From the foregoing, it is apparent that the present invention provides a novel bait box for keeping live fishing bait, wherein the bait may be stored for a maximum length of time. The box may be divided into two or more compartments for the storage of various types of bait in one container, and each compartment will be exposed to air or water, depending upon the use of the box. A novel cover is provided on the box to effectively seal the box yet provide convenient access into the box for the removal of bait. The box is sturdy and durable, and may be readily used as a seat for a fisherman.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A fishing bait box, comprising a housing having a bait inlet, an elastic cover secured to the housing over the inlet, said cover being split, one wall of said housing having a transverse slot therein extending substantially across the housing, a partition of substantially the same length as said slot and being of a size for insertion in said slot and extend to the opposite wall of the housing, brace rods secured only to said walls and having their sides spaced from the remaining walls of said housing and extending across the interior of the housing on opposite sides of said slot to brace the partition, and a latch on the housing arranged to lock the partition in said slot.

2. A fishing bait box, comprising a housing having a bait inlet, an elastic cover secured to the housing over the inlet, said cover being split, one wall of said housing having a transverse slot therein extending substantially across the housing, a partition of substantially the same length as said slot and being of a size for insertion in said slot and extend to the opposite wall of the housing, brace rods secured only to said walls and having their sides spaced from the remaining walls of said housing and extending across the interior of the housing on opposite sides of said slot to brace the partition, a latch on the housing arranged to lock the partition in said slot, one side of said housing being open, and a screen secured to the housing over the open side.

3. A fishing bait box, comprising a housing having only a single bait inlet, an elastic cover secured to the housing over the inlet, said cover being split, one wall of said housing having a transverse slot therein on each side of the inlet extending substantially across the housing, a pair of partitions, each of said partitions being of a size for insertion in the respective slot and extend to the opposite wall of the housing, brace rods secured across the interior of the housing on opposite sides of each of said slots to brace the respective partition, and a latch on the housing arranged to lock each of the partitions in its respective slot, one side of said housing being open, and a screen secured to the housing over the open side.

References Cited in the file of this patent

UNITED STATES PATENTS

| Number | Name | Date |
|---|---|---|
| 760,434 | Donohue | May 24, 1904 |
| 813,944 | Dubar | Feb. 27, 1906 |
| 882,184 | Willard | Mar. 17, 1908 |
| 963,285 | Fly | July 5, 1910 |
| 1,150,776 | Lamb | Aug. 17, 1915 |
| 1,382,416 | Dresser | June 21, 1921 |
| 2,256,928 | Slack | Sept. 23, 1941 |
| 2,328,993 | Norling | Sept. 7, 1943 |
| 2,412,332 | Hansen | Dec. 10, 1946 |
| 2,538,670 | Cohen | Jan. 16, 1951 |
| 2,538,853 | Worl | Jan. 23, 1951 |
| 2,541,681 | Andrews | Feb. 13, 1951 |
| 2,544,049 | Sawner | Mar. 6, 1951 |
| 2,614,357 | Stoddard | Oct. 21, 1952 |